(12) United States Patent
Roesch et al.

(10) Patent No.: US 9,488,223 B2
(45) Date of Patent: Nov. 8, 2016

(54) GUIDE CARRIAGE WITH FASTENING BORE WHICH IS A COMPONENT OF A LUBRICANT FLOW PATH

(71) Applicant: Robert Bosch GmbH, Stuttgart (DE)

(72) Inventors: Gerhard Roesch, Bergrheinfeld (DE); Stefan Dorn, Arnstein (DE); Martina Elting, Schweinfurt (DE); Matthias Zeier, Oberleichtersbach (DE); Juergen Schenk, Knetzgau (DE); Sebastian Schierling, Knetzgau-Oberschwappach (DE); Michael Korbacher, Wipfeld (DE); Gerd Spatschek, Mellrichstadt (DE); Wolfgang Kuellstaedt, Grafenrheinfeld (DE); Richard Kuehnlein, Graefendorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/723,002

(22) Filed: May 27, 2015

(65) Prior Publication Data
US 2015/0345560 A1    Dec. 3, 2015

(30) Foreign Application Priority Data
May 28, 2014 (DE) .................. 10 2014 210 171

(51) Int. Cl.
| F16C 33/66 | (2006.01) |
| F16C 29/06 | (2006.01) |
| F16C 29/08 | (2006.01) |

(52) U.S. Cl.
CPC ............ *F16C 33/66* (2013.01); *F16C 29/064* (2013.01); *F16C 29/0609* (2013.01); *F16C 29/0645* (2013.01); *F16C 29/086* (2013.01);

(Continued)

(58) Field of Classification Search
CPC .................................................. F16C 29/0609
See application file for complete search history.

(56) References Cited

U.S. PATENT DOCUMENTS

| 4,850,720 A | 7/1989 | Osawa |
| 5,139,347 A * | 8/1992 | Hattori ............... F16C 29/0609 384/15 |

(Continued)

FOREIGN PATENT DOCUMENTS

| DE | 10 2006 027 061 B4 | 3/2008 |
| EP | 1 296 075 A1 | 9/2002 |

(Continued)

OTHER PUBLICATIONS

German Search Report corresponding to DE 10 2014 210 171.9, dated Mar. 30, 2015 (German language document) (8 pages).

*Primary Examiner* — Thomas R. Hannon
(74) *Attorney, Agent, or Firm* — Maginot, Moore & Beck LLP (57) ABSTRACT

A guide carriage for an elongated guide rail includes a main body, an end cap, and at least one row of rolling bodies accommodated in a continuous bypass channel. The end cap bears indirectly against a longitudinal end face of the main body and has a fastening bore through which a fastening screw passes. The fastening screw is screwed into the main body. The continuous bypass channel has a supporting portion and a return channel that are connected via a curved bypass channel that is arranged in the end cap. A lubricant flow path is arranged in the end cap and extends from a lubrication port to the row of rolling bodies. A first cavity is arranged between the fastening bore and the fastening screw. The first cavity forms a component of the lubricant flow path.

10 Claims, 4 Drawing Sheets (52) U.S. Cl.
CPC ....... *F16C33/6618* (2013.01); *F16C 33/6629* (2013.01); *F16C 33/6655* (2013.01); *F16C 33/6681* (2013.01)

(56) References Cited

U.S. PATENT DOCUMENTS

| | | | |
|---|---|---|---|
| 2002/0164094 A1* | 11/2002 | Luo | F16C 29/0609 384/45 |
| 2005/0041896 A1* | 2/2005 | Itabashi | F16C 29/0609 384/45 |
| 2009/0196539 A1* | 8/2009 | Pfeuffer | F16C 29/0609 384/45 |
| 2014/0079345 A1* | 3/2014 | Li | F16C 33/6681 384/13 |
| 2015/0023618 A1* | 1/2015 | Mizumura | F16C 33/6659 384/13 |

FOREIGN PATENT DOCUMENTS

| | | |
|---|---|---|
| EP | 0 971 140 B1 | 3/2007 |
| EP | 1 676 040 B1 | 4/2009 |
| JP | H09-303392 A | 11/1997 |
| JP | H11-294453 A | 10/1999 |
| JP | 2006-226428 A | 8/2006 |
| JP | 2008-2493 A | 1/2008 |
| JP | 2008-138840 A | 6/2008 |
| JP | 2010-190316 A | 9/2010 |
| WO | 2013114475 A1 | 8/2013 |

* cited by examiner

GUIDE CARRIAGE WITH FASTENING BORE WHICH IS A COMPONENT OF A LUBRICANT FLOW PATH

This application claims priority under 35 U.S.C. §119 to patent application no. DE 10 2014 210 171.9, filed on May 28, 2014 in Germany, the disclosure of which is incorporated herein by reference in its entirety.

BACKGROUND

The disclosure relates to a guide carriage.

EP 971 140 B1 discloses a guide carriage which is provided for use with an elongated guide rail. The guide carriage comprises four rows of spherical rolling bodies which are accommodated in each case in an assigned continuous bypass channel. Each bypass channel comprises a supporting portion and a return channel, which are connected to one another at both ends via in each case a curved bypass channel. The supporting portion is delimited by a carriage track on the guide carriage and a rail track on the guide rail which extend in each case in a longitudinal direction. All the bypass channels are arranged within two separate end caps, which are fastened on two opposite longitudinal end faces of the main body of the guide carriage. A separate sealing plate is arranged between the end cap and the main body, wherein the present disclosure can also be used for guide carriages without such a sealing plate. Each end cap has in total two fastening bores through which an assigned fastening screw passes which is screwed into the main body.

Several lubricant flow paths are furthermore provided in the guide carriage, which paths extend in each case from a lubricant port to a row of rolling bodies. A total of two lateral lubrication ports, an end-side lubrication port and an upper lubrication port, are provided at the end cap of which in each case only a single port is used, the other lubrication ports being tightly closed.

The disadvantage of the known guide carriage lies in the fact that a portion of this lubricant flow path must be guided at a very small distance past the fastening bore. This results in problems in sealing off the lubricant flow path from the escape of lubricant.

The advantage of the present disclosure lies in the fact that the lubricant flow path is sealed off particularly well from the escape of lubricant, wherein the guide carriage can be manufactured at particularly low cost. Moreover, the guide carriage according to the disclosure has a particularly small number of individual parts.

SUMMARY

According to the disclosure, it is proposed that a first cavity is provided at least between one of the at least one fastening bore and the assigned fastening screw, which cavity is a component of one of the at least one lubricant flow path. As a result of this, it is no longer necessary to guide the lubricant flow path at a small distance past the fastening bore. The guide carriage is preferably formed, as seen in cross-section, to be U-shaped with a base and two U-limbs, each U-limb being assigned a single fastening bore, both fastening bores being a component of different lubricant flow paths. The first cavity is ideally formed to be circular ring-shaped, wherein, as a result of mounting tolerances, deviations can arise in terms of the central location of the fastening screw relative to the fastening bore. The at least one lubricant flow path preferably has several portions which are formed in the form of channels. Closed channels in a single component can be provided. Open channels in one component can, however, also be provided which are covered by a different component so that a closed channel is produced.

The at least one fastening bore is preferably aligned parallel to the longitudinal direction. The return channel preferably runs parallel to the longitudinal direction and is most preferably delimited directly by the main body. The rolling bodies are preferably spheres. The longitudinal end face of the main body is preferably flat. The lubricant is preferably lubricating oil or lubricating grease. The main body is preferably composed of metal, in particular of steel. The at least one end cap is preferably composed of plastic, in particular of polyamide. It is most preferably manufactured using the injection molding method. The carriage tracks are preferably arranged on a separate track insert extending in the longitudinal direction and bearing against the main body. The track insert is preferably composed of hardened steel.

Advantageous further developments and improvements of the disclosure are indicated in the dependent claims.

It is preferred that several lubricant flow paths are provided to which are assigned different lubrication ports and/or rows of rolling bodies, all of the lubricant flow paths having a shared second cavity, the first cavity being arranged on the rolling body side of the second cavity in the corresponding lubricant flow path. The lubricant thus always flows via the first cavity independently of the selected lubricant flow path. It can therefore flow to each row of rolling bodies no matter which lubricant port is selected. The flow resistance to all rows of rolling bodies can have approximately the same dimensions since the central second cavity is arranged upstream of the first cavity.

It is preferred that the a lubrication bore passes through the end cap, which lubrication bore extends from an outer longitudinal end face, facing away from the main body, of the end cap in the longitudinal direction, the lubrication bore being arranged on the rolling body side of the first cavity in the corresponding lubricant flow path. The corresponding lubricant flow path has a particularly short length and a correspondingly small volume. It is therefore possible to use lubricant impulses with very small lubricant volumes without the risk of inadequate lubrication of the guide carriage.

It is preferable that at least two rows of rolling bodies are provided which have two adjacent, parallel bypass channels, wherein they have in each case a radially outer bypass surface which are arranged directly on the end cap, a discharge opening of the lubrication bore being arranged between the stated outer bypass surfaces. The parallel, curved bypass channels preferably have a common axis of curvature. The outer bypass surfaces are preferably arranged radially on the outside in relation to the axis of curvature. The path from the discharge opening to the rolling bodies running along the outer bypass surfaces is very short so that in general a short lubricant flow path is produced which can be easily manufactured.

It is preferable that a radially inner bypass surface of the bypass channel is arranged on a separate rolling body guide part which has a flat section which is arranged opposite a discharge opening of the lubrication bore. A cavity is created by the stated flat section, in which cavity the lubricant can flow from the stated discharge opening to the rolling bodies.

It is preferable that a first open lubrication channel is provided on the outer longitudinal end face of the end cap, which lubrication channel connects the first cavity to the lubrication bore, it being covered by a separate end seal which is formed at least in portions in the form of a flat plate. The first open lubrication channel can be manufactured particularly easily and at low cost using the plastic injection molding method. The end seal is preferably composed of an elastomer so that it seals off the first open lubrication channel particularly tightly. A sealing lip is preferably arranged at the end cap on both sides of the open first lubrication channel. The plate-like portion of the end seal preferably has a constant thickness.

It is preferred that the first open lubrication channel discharges into a distribution recess annularly surrounding the assigned fastening bore. The stated distribution recess is preferably formed in the manner of a depression on the fastening bore. As a result of this, it should be achieved that the lubricant can flow through the first cavity independently of the tolerance-induced center error of the fastening screw in the fastening bore. The discharge opening, discharging into the distribution recess, of the first open lubrication channel can in no event be covered by the fastening screw.

It is preferred that the end seal has an end sealing lip which is arranged so that it is in sealing engagement with the guide rail when the guide carriage is mounted thereon. The end seal thus seals off the guide carriage from the penetration of foreign bodies, in particular dirt.

It is preferred that the end seal is covered by a deflector plate composed of metal, the at least one fastening screw passing through both the deflector plate and the end seal. The clamping force of the fastening screw is thus distributed by the rigid deflector plate substantially evenly to the entire end seal. The deflector plate is manufactured by deep drawing, bending and/or punching machining from a flat plate with a constant thickness. It is composed preferably of stainless steel. In the region of the guide rail, the deflector plate is preferably formed at a small distance of, for example, 0.3 mm to 1 mm equidistantly to the guide rail. It can thus deflect foreign bodies from the guide rail without contacting it. The end seal is thus protected from damage.

It is preferred that the at least one fastening screw has a head which bears against the deflector plate, the fastening screw being adapted to the remaining guide carriage in such a manner that the deflector plate forms the single screw stop for the fastening screw. A sealing bearing of the head against the deflector plate can thus be achieved. The corresponding sealing force is set by the screw torque with which the fastening screw is screwed into the main body. The deflector plate preferably has a conical depression which is most preferably deep drawn. The head of the fastening screw is preferably formed to be conical.

It is preferred that the end cap has an inner longitudinal end face which faces the main body, the inner longitudinal end face being formed at least in portions by at least one reinforcement web which extends parallel to the longitudinal direction, a second open lubrication channel being provided on the at least one reinforcement web in the region of the inner longitudinal end face, which lubrication channel is a component of the at least one lubricant flow path. The sealing plate known from EP 971 140 B1 can therefore be omitted. However, there is no risk of a deformation of the end cap or leakage from the lubricant flow path.

It will be obvious that the features mentioned above and still to be explained below can be used not only in the respectively indicated combination, rather also in other combinations or on their own without departing from the scope of the present disclosure.

BRIEF DESCRIPTION OF THE DRAWINGS

The disclosure is explained in greater detail below on the basis of the enclosed drawings. In the drawings.

DETAILED DESCRIPTION

Figure 1:
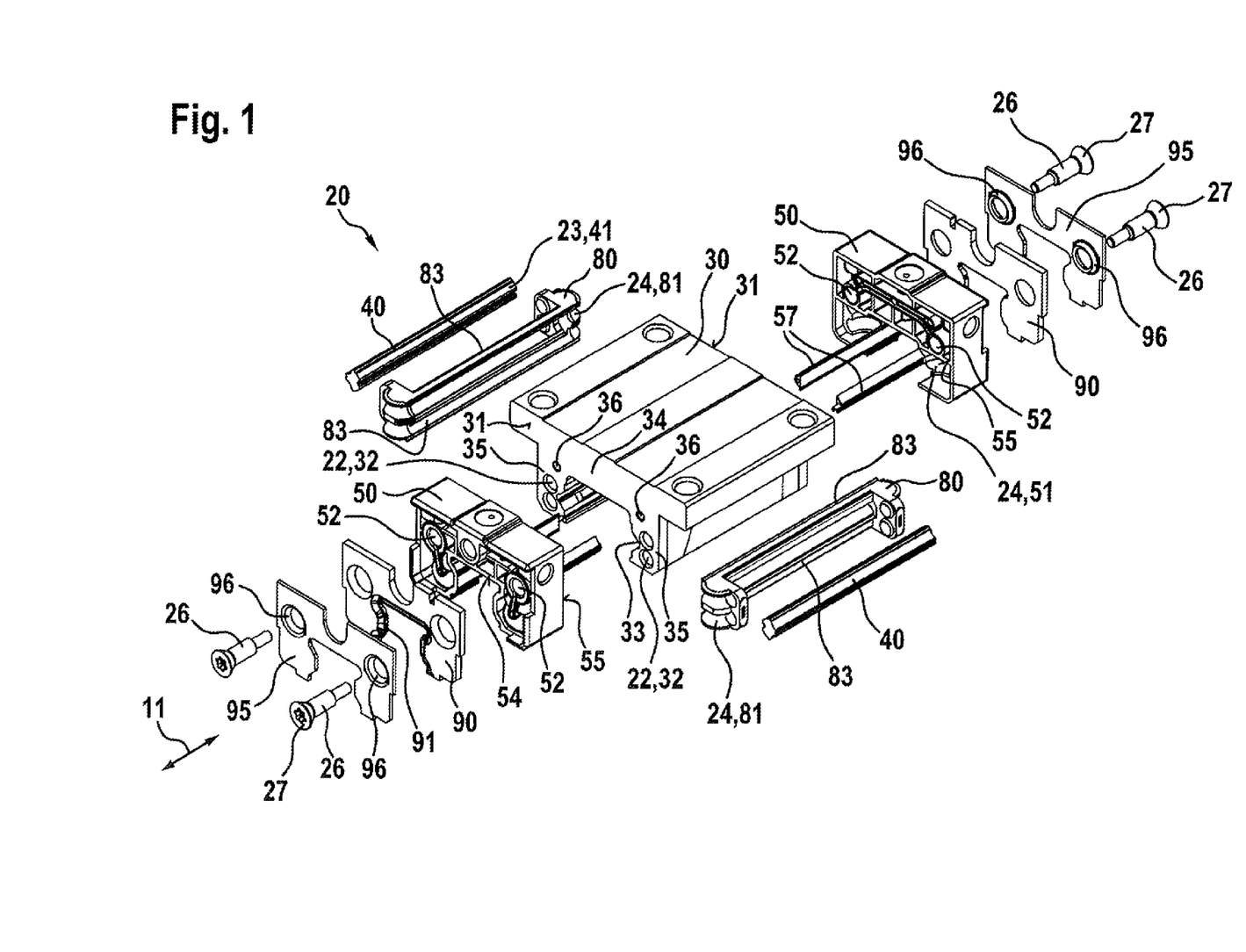
FIG. 1 shows an exploded view of a guide carriage according to the disclosure.

FIG. 1 shows an exploded view of a guide carriage 20 according to the disclosure. Guide carriage 20 comprises a main body 30 composed of unhardened steel which extends in a longitudinal direction 11 with a substantially constant U-shaped cross-sectional form. In each case a V-shaped groove 33, on which in each case a separate track insert 40, which is composed of hardened roller bearing steel, bears, is arranged on the inside of U-limbs 35. Both track inserts 40 extend with a substantially constant cross-sectional form in longitudinal direction 11, these having in each case two carriage tracks 41 so that the guide carriage has a total of four rows of rolling bodies (No. 21 in FIG. 2). The present disclosure can also be used for guide carriages in which the hardened carriage track is arranged directly on main body 30.

In each case an end cap 50 with an inner longitudinal end side 55 directly adjoins both opposite, flat longitudinal end faces 31 of main body 30. Both end caps 50 are formed identically, wherein they are manufactured from plastic using the injection molding process. In each case one radially outer bypass surface 51 of a curved bypass channel 24 is provided in the two end caps for each of the four rolling body rows. In each case two assigned ends of both rolling body guide parts 80 are inserted into end cap 50, on which rolling body guide parts 80 radially inner bypass surfaces 81 of curved bypass channels 24 are provided.

A return channel 32, which is formed in the present case directly in main body 30 in the form of a circular bore which is provided at its two ends with a conical depression, runs between curved bypass channels 24 in opposite end caps 50. The present disclosure can, however, also be used for guide carriages in which the return channel is formed in a separate return pipe or externally on the main body.

Two circular fastening bores 52 which extend in longitudinal direction 11 are arranged in end caps 50. An assigned fastening screw 26 passes through fastening bores, which fastening screw 26 has an external thread on the end side which is screwed into an assigned internal thread 36 in main body 30. Internal thread 36 is arranged approximately in the region of the transition between base 34 and an assigned U-limb 35 of main body 30 so that both fastening screws 26 press assigned end cap 50 over the entire inner longitudinal end face 55 evenly on the longitudinal end face of main body 30.

In each case a U-shaped end seal 90 lies on outer longitudinal end face 54 of end cap 50, which end seal 90 is formed substantially as a flat plate with a constant thickness, wherein it is composed of an elastomer, in particular thermoplastic ether ester elastomer (TEEE, commercial name "Hytrel"). End seal 90 is provided with an end sealing lip 91 which bears against the guide rail (No. 10 in FIG. 2) in a sealing manner.

In each case a U-shaped deflector plate 95 lies in turn externally on end seal 90, which deflector plate 95 is formed in the form of a flat plate with a constant thickness, wherein it is composed of stainless steel. Deflector plate 95 is formed at a small distance equidistantly to the guide rail so that foreign bodies, for example, metal cuttings can be deflected off this. Fastening screws 26 pass through both deflector plate 95 and end seal 90. A conical head 27 of fastening screw 26 bears against a deep-drawn conical depression 96 on deflector plate 95. Depression 96 is adapted precisely to head 27 so a fluid-impervious contact is provided over the entire circumference so that no lubricant escapes there. Head 27 of fastening screw 26 is provided with a Torx profile for engagement of a screwdriver tool. On the base of the Torx profile, an internal thread is arranged in fastening screw 26 in order to fasten, for example, a measuring head in accordance with DE 10 2006 027 061 B4 on guide carriage 20.

Reference should also be made to rolling body retaining webs 57 which are formed in one piece on end caps 50, these extending between U-limbs 35 of main body 30. Rolling body retaining webs 57 of both end caps 50 extend together without gaps over the entire length of main body 30.

Figure 2:
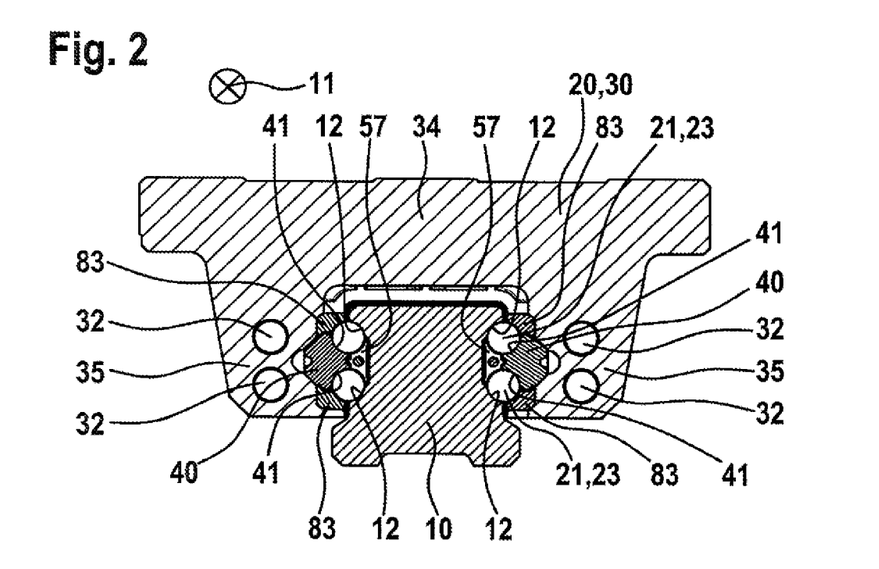
FIG. 2 shows a cross-section of the guide carriage according to FIG. 1 with the assigned guide rail.

FIG. 2 shows a cross-section of guide carriage 20 according to FIG. 1 with assigned guide rail 10. The sectional plane runs perpendicular to longitudinal direction 11 in the center of main body 30.

Guide rail 10 is composed of steel and has a hardened edge layer in the region of rail tracks 12. It extends with the represented constant cross-sectional form precisely along longitudinal direction 11. A total of four rail tracks 12, which together with opposite carriage track 41 delimit supporting portion 23 of the continuous circumferential channel, are arranged on guide rail 12. Rail and carriage tracks 12; 41 are formed to be circular as seen in cross-section, wherein they are adapted to spherical rolling bodies 12 with narrow osculation. Rolling body retaining web 57 should furthermore be pointed out which retains rolling bodies 21 together with guide portions 83 of the rolling body retaining parts in guide carriage 20 when this is not located on guide rail 10.

Present guide carriage 20 has four rows of continuously revolving rolling bodies 21 which are loaded in what is referred to as an O-arrangement. The present disclosure can, however, also equally well be used for guide carriages with an X-arrangement or for guide carriages with roller-shaped rolling bodies.

Figure 3:
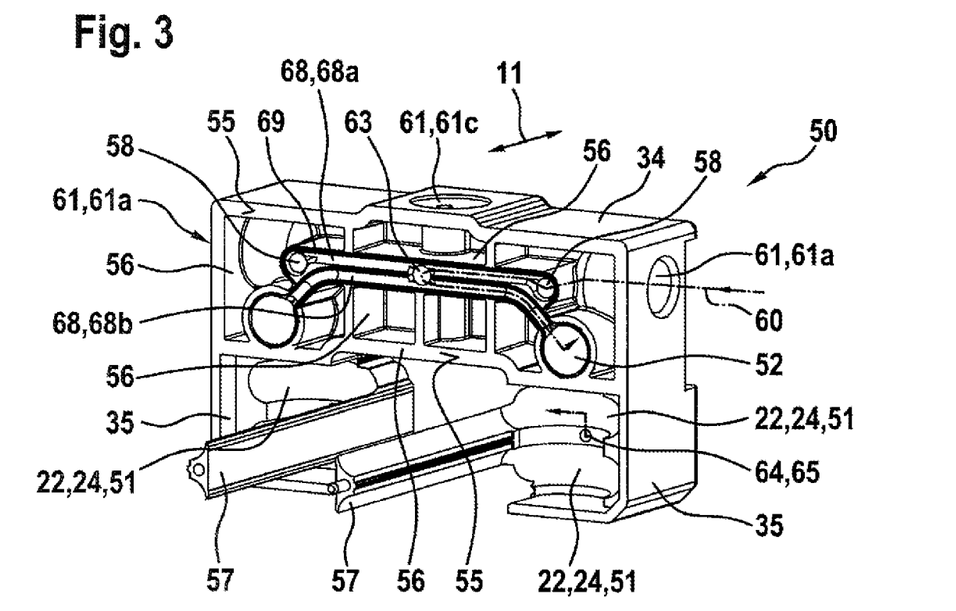
FIG. 3 shows a perspective view of the end cap from the side facing towards the main body.

FIG. 3 shows a perspective view of end cap 50 from the side facing towards the main body. End cap 50 is produced from plastic, in particular from polyamide using the injection molding method. In order to avoid distortion in the event of solidification of the plastic, it is formed overall with a substantially constant wall thickness. It correspondingly comprises a plurality of plate-shaped reinforcement webs 56 which extend in longitudinal direction 11. The ends faces of said webs 56 form a flat inner longitudinal end face 55 of end cap 50 which bears against the flat longitudinal end face of the main body.

A lubrication channel system is arranged in the region of base 34 of generally U-shaped end cap 50, which lubrication channel system has a plurality of lubricant flow paths, wherein a lubricant flow path is marked by a dot-dash line 60. Marked lubricant flow path begins at a lateral lubrication port 61a which is formed in the form of an internal thread. It continues via a circular-cylindrical longitudinal bore 58 which extends in longitudinal direction 11. Longitudinal bore 58 is open at the end (visible in FIG. 3) facing the main body, wherein it is tightly closed at the opposite end. It runs at a small distance past the base of assigned lateral lubrication port 61a so that a thin plastic skin remains there in the delivery state of the guide carriage, through which plastic skin the user must penetrate when relevant lubrication port 61a is supposed to be used. Otherwise, the stated plastic skin prevents lubricant from escaping from an unused lubrication port 61.

Figure 3A:
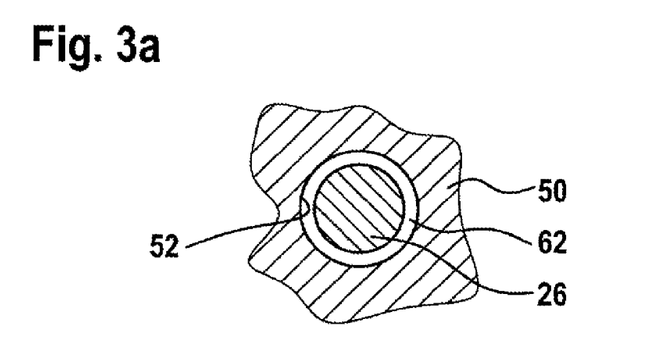
FIG. 3a shows a highly schematic cross-sectional view of the first cavity.

Fastening bores 52 are arranged adjacent to longitudinal bores 58, which fastening bores 52 pass through the end cap in longitudinal direction 11. Fastening bore 52 delimits, as represented in FIG. 3a, together with fastening screw 26 a circular ring-shaped first cavity 62 which extends over the entire length of end cap 50. Lubricant flow path 60 does not, however, lead on the shortest path to fastening bore 52. Rather, all the lubricant paths, which run from any desired lubrication port 61 to any desired inner radially outer bypass surface 51, lead via a central second cavity 63 so that all the lubricant paths have approximately the same length, wherein they counteract the lubricant with approximately the same flow resistance. Second cavity 63 coincides with a longitudinal bore which leads to upper lubrication port 61c and to end-side lubrication port (No. 61b in FIG. 4). It is, however, also conceivable to form the second cavity as a recess in inner longitudinal end face 55 of end cap 50 which is covered by the longitudinal end face of the main body.

A first portion 68a of a second lubrication channel 68 leads from longitudinal bores 58 to second cavity 63, which first portion 68a is formed as an open channel which is covered by the longitudinal end face of the main body. A second portion 68b, which is formed analogously to first portion 68a of second lubrication channel 68, leads from second cavity 63 to fastening bore 52. There is arranged on both sides of second lubrication channel 68 in each case a sealing projection 69 which is plastically deformed during screwing of end cap 50 onto the main body so that lubricant flow path 60 is tightly closed. The elastic deformation of end cap 50 during tightening on the main body was taken into account in the dimensioning of the height of sealing projection 69 by virtue of the fact that sealing projection 69 is designed to be increasingly higher, the further distant it is from fastening bores 52. Sealing projection 69 furthermore surrounds fastening bore 52. First and second portion 68a, 68b of second lubrication channel 68 furthermore have a shared sealing projection 69 which primarily ensures that the lubricant flows via second cavity 63.

Open second lubrication channel 68 is provided entirely on the end face of a single assigned web. It is, however, also conceivable to form corresponding first and second portions 68a, 68b on webs which are formed separately from one another and are connected to one another via second cavity 63.

A discharge opening 65 of a lubrication bore 64 is furthermore apparent in FIG. 3 between two adjacent radially outer bypass surfaces 51, through which discharge opening 65 the end cap passes in longitudinal direction 11. Lubrication bore 64 is a component of lubricant flow path 60 described above which otherwise runs on the opposite side of end cap 50. A flat section (No. 82 in FIG. 5) is provided opposite discharge opening 65 on the assigned rolling body guide part so that a clearance is located there through which the lubricant can flow to the rolling bodies running past it.

Figure 4:
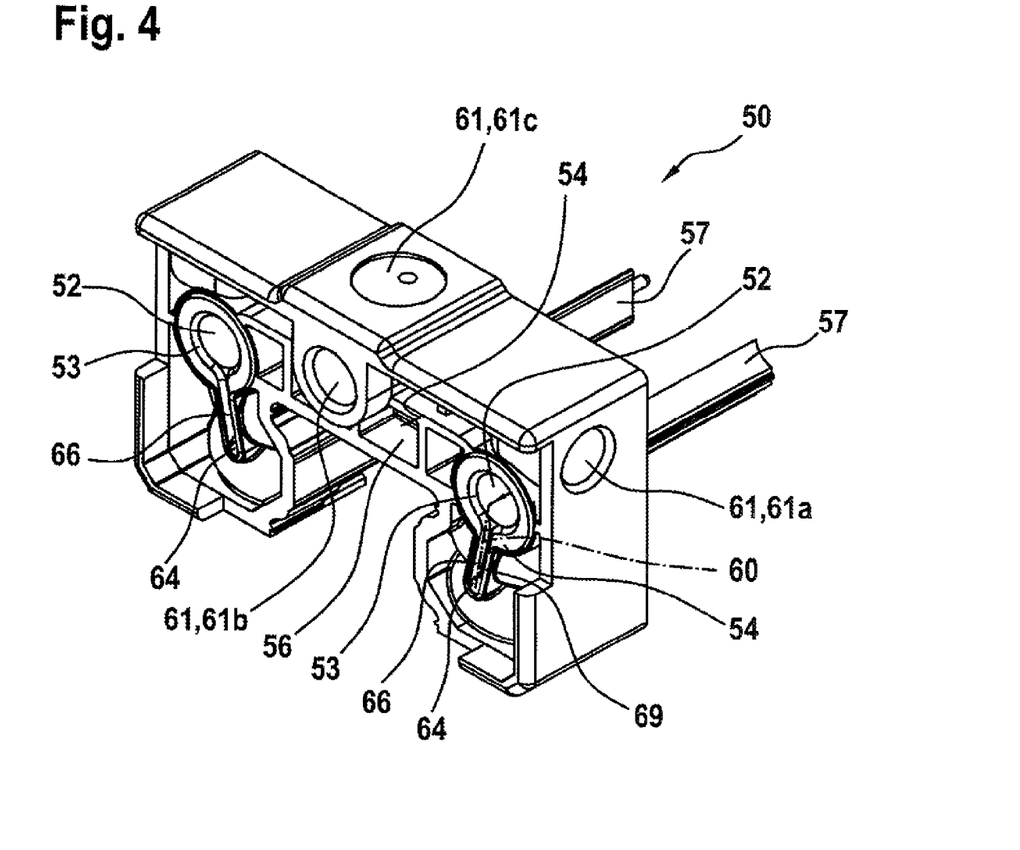
FIG. 4 shows a perspective view of the end cap from the side facing away from the main body.

FIG. 4 shows a perspective view of end cap 50 from the side facing away from the main body. Reinforcement webs 56 already discussed are also apparent on this side of end cap 50, wherein there they form a flat outer longitudinal end face 54 of end cap 50 on which the end seal (No. 90 in FIG. 1) lies. An open first lubrication channel 66, which is a component of lubricant flow path 60, runs in the corresponding plane, wherein it connects fastening bore 52 to lubrication bore 64 on a straight path. First lubrication channel 66 is covered by the end seal (No. 90 in FIG. 1) so that no lubricant can escape. First lubrication channel 66 discharges into a distribution recess 53 annularly surrounding fastening bore 52, which distribution recess 53 is formed in the manner of a depression. Distribution recess 53 is primarily provided for the event that the fastening screw (No. 26 in FIG. 1), due to tolerances, bears precisely against the discharge opening of first lubrication channel 66 on the side wall of fastening bore 52. Lubricant can then still flow past the fastening screw from the first cavity (No. 62 in FIG. 3a) into first lubrication channel 66.

First lubrication channel 66 and fastening bore 52 are surrounded without interruption by a sealing projection 69 which is pushed into the elastic end seal in order to improve sealing.

Figure 5:
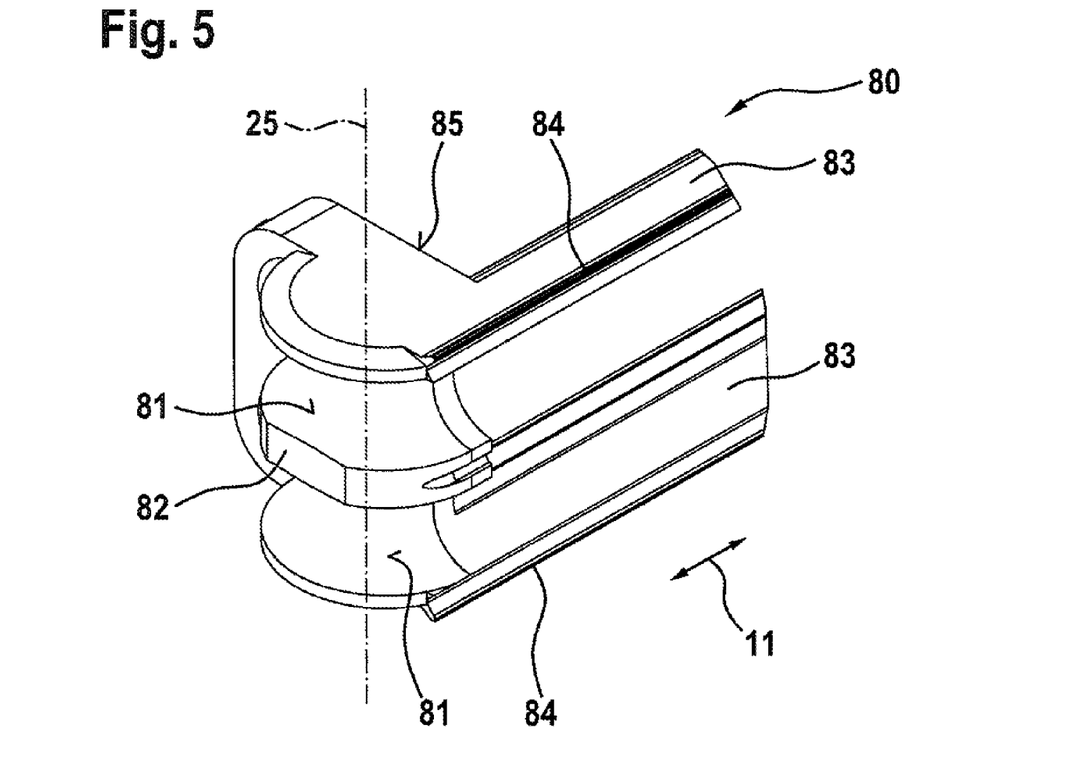
FIG. 5 shows a perspective partial view of the rolling body guide part in the region of the radially inner bypass surfaces.

FIG. 5 shows a perspective partial view of rolling body guide part 80 in the region of radially inner bypass surfaces 81. Two parallel running rows of rolling bodies are assigned to a rolling body guide part 80. It therefore has at both ends two radially inner bypass surfaces 81 of the bypass channel which run in a circularly curved manner with the same radius in relation to a common axis of curvature 25. Flat section 82 which has already been discussed is arranged between the two radially inner bypass surfaces 81.

Moreover, two parallel guide portions 83 are provided in one piece on rolling body guide part 80, which guide portions 83 run with a constant cross-sectional form in longitudinal direction 11. A longitudinal sealing lip 84 is provided in each case on guide portions 83, which sealing lip 84 bears sealingly against the guide rail when the guide carriage is mounted thereon. Guide portions 83 furthermore retain the rolling bodies in the guide carriage when this is not located on the guide rail.

Rolling body guide part 80 is formed in mirror-symmetry relative to a first plane of symmetry which runs perpendicular to axis of curvature 25 of the curved bypass channels. It is furthermore formed in mirror-symmetry to a second plane of symmetry which runs perpendicular to longitudinal direction 11. It should be noted here that axis of curvature 25 and longitudinal direction 11 are aligned perpendicular to one another. The rolling body guide part is composed of an elastomer.

LIST OF REFERENCE NUMBERS

10 Guide rail
11 Longitudinal direction
12 Rail track
20 Guide carriage
21 Rolling body
22 Bypass channel
23 Supporting portion
24 Bypass channel
25 Axis of curvature of the bypass channel
26 Fastening screw
27 Head of the fastening screw
30 Main body
31 Longitudinal end face of the main body
32 Return channel
33 V-shaped groove
34 Base
35 U-limb
36 Internal thread
40 Track insert
41 Carriage track
50 End cap
51 Radially outer bypass surface
52 Fastening bore
53 Annular distribution recess
54 Outer longitudinal end face of the end cap
55 Inner longitudinal end face of the end cap
56 Reinforcement web
57 Rolling body retaining web
58 Longitudinal bore
60 Lubricant flow path
61 Lubrication port
61a Lateral lubrication port
61b End-side lubrication port
61c Upper lubrication port
62 First cavity
63 Second cavity
64 Lubrication bore
65 Discharge opening of the lubrication bore
66 First open lubrication channel
67 Sealing lip
68 Second open lubrication channel
68a First portion of the second lubrication channel
68b Second portion of the second lubrication channel
69 Sealing projection
80 Rolling body guide part
81 Radially inner bypass surface
82 Flat section
83 Guide portion
84 Longitudinal sealing lip
90 End seal
91 End sealing lip
95 Deflector plate
96 Depression

What is claimed is:

1. A guide carriage for use with an elongated guide rail, comprising:
   a main body having a longitudinal end face;
   a separate end cap bearing at least indirectly against the longitudinal end face of the main body, the end cap having at least one fastening bore through which a corresponding fastening screw passes, the fastening screw being screwed into the main body;
   at least one row of rolling bodies accommodated in an assigned continuous bypass channel, the continuous bypass channel having a supporting portion and a return channel that are connected to one another at respective opposite ends via a curved bypass channel, the supporting portion being delimited by a carriage track extending in a longitudinal direction on the guide carriage and a rail track on the guide rail, the curved bypass channel being arranged within the end cap; and
   at least one lubricant flow path arranged in the end cap, the lubricant flow path extending from a lubrication port to one of the at least one row of rolling bodies,
   wherein a first cavity is arranged at least between one of the at least one fastening bore and the corresponding fastening screw, the cavity being configured to form a component of one of the at least one lubricant flow path, and
   wherein a lubrication bore passes through the end cap and extends in the longitudinal direction from an outer longitudinal end face, facing away from the main body, of the end cap, the lubrication bore being arranged on a rolling body side of the first cavity in the corresponding lubricant flow path.

2. The guide carriage according to claim 1, further including:
several lubricant flow paths to which different lubrication ports and/or rows of rolling bodies are assigned, wherein:
all of the lubricant flow paths have a shared second cavity, and
the first cavity is arranged on a rolling body side of the second cavity in the corresponding lubricant flow path.

3. The guide carriage according to claim 1, wherein:
the guide carriage includes at least two rows of rolling bodies that have two adjacent, parallel bypass channels,
the two adjacent, parallel bypass channels each have a radially outer bypass surface arranged directly on the end cap, and
a discharge opening of the lubrication bore is arranged between the respective outer bypass surfaces.

4. The guide carriage according to claim 1, wherein a radially inner bypass surface of the curved bypass channel is arranged on a separate rolling body guide part, the separate rolling body guide part having a flat section arranged opposite a discharge opening of the lubrication bore.

5. The guide carriage according to claim 1, wherein a first open lubrication channel is arranged on the outer longitudinal end face of the end cap, the first open lubrication channel connecting the first cavity to the lubrication bore and being covered by a separate end seal configured at least in portions as a flat plate.

6. The guide carriage according to claim 5, wherein the first open lubrication channel discharges into a distribution recess that annularly surrounds the fastening bore.

7. The guide carriage according to claim 5, wherein the end seal has an end sealing lip arranged so as to be in sealing engagement with the guide rail when the guide carriage is mounted thereon.

8. The guide carriage according to claim 5, wherein the end seal is covered by a deflector plate composed of metal, the at least one fastening screw passing through both the deflector plate and the end seal.

9. The guide carriage according to claim 8, wherein the at least one fastening screw has a head that bears against the deflector plate such that the deflector plate forms a single screw stop for the fastening screw.

10. The guide carriage according to claim 5, wherein:
the end cap has an inner longitudinal end face that faces towards the main body, the inner longitudinal end face being formed at least in portions by at least one reinforcement web that extends parallel to the longitudinal direction, and
a second open lubrication channel is arranged on the at least one reinforcement web in the region of the inner longitudinal end face, the second open lubrication channel being configured to form a component of the at least one lubricant flow path.

* * * * *